United States Patent [19]

Cain

[11] 4,261,178

[45] Apr. 14, 1981

[54] ENVIRONMENTAL PROTECTION REFRIGERATION DISPOSAL AND CHARGING SYSTEM

[75] Inventor: Robert L. Cain, Bryan, Ohio

[73] Assignee: Robinair Manufacturing Corporation, Montpelier, Ohio

[21] Appl. No.: 4,657

[22] Filed: Jan. 19, 1979

[51] Int. Cl.³ .............................................. F25B 45/00
[52] U.S. Cl. ...................................... 62/149; 62/292; 62/5; 417/37
[58] Field of Search .................. 62/292, 77, 149, 513; 417/37, 38

[56] References Cited

U.S. PATENT DOCUMENTS

| 2,720,837 | 10/1955 | Reeve | 417/37 |
| 2,893,217 | 7/1959 | Nigro | 62/126 |
| 3,232,070 | 2/1966 | Sparano | 62/149 |
| 3,400,552 | 9/1968 | Johnson et al. | 62/149 |
| 3,538,961 | 11/1970 | Bruce | 141/61 |
| 3,695,055 | 10/1972 | Bruce | 62/157 |
| 3,699,781 | 10/1972 | Taylor | 62/474 |
| 3,715,173 | 2/1973 | Froeschner | 417/37 |
| 3,826,104 | 7/1974 | Lamb et al. | 62/149 |
| 3,873,289 | 3/1975 | White | 62/292 X |
| 3,922,111 | 11/1975 | Peters | 417/38 X |
| 4,132,242 | 1/1979 | Carroll, Jr. | 417/38 X |

Primary Examiner—William E. Tapolcai, Jr.
Attorney, Agent, or Firm—Beaman & Beaman

[57] ABSTRACT

The invention pertains to an environmental protection system and method for withdrawing and charging refrigerants, particularly fluorocarbon refrigerants, with respect to refrigeration systems as used for refrigeration, dehumidifying, air conditioning and the like without contamination of the atmosphere. Refrigerant is evacuated from a refrigeration system through a closed circuit into a closed disposal or storage container, and in an embodiment of the invention direct evacuation pumping of the refrigerant may be proceeded by drawing the majority of the refrigerant from the refrigeration system by means of a preliminary vacuum tank connected in series with a refrigerant disposal container. Additionally, the invention contemplates combining a refrigerant charging circuit with the refrigerant evacuation circuit in order to provide complete refrigeration system servicing without the release of refrigerant to the atmosphere.

6 Claims, 2 Drawing Figures

ENVIRONMENTAL PROTECTION REFRIGERATION DISPOSAL AND CHARGING SYSTEM

BACKGROUND OF THE INVENTION

The invention pertains to environmental protecting evacuation and charging systems for refrigeration system refrigerants.

Refrigeration systems, such as commonly employed in refrigerators and air conditioning systems, operate most efficiently when the refrigerant meets predetermined standards of purity and is relatively free of foreign matter such as oil, air and water. Over extended periods of use refrigerant becomes contaminated due to leakage in the refrigeration system, or by the compressor, and it is a standard maintenance procedure to periodically remove and recharge the refrigerant within a refrigeration system. In the past, when servicing a refrigeration system wherein refrigerant must be removed it has been common practice to permit the refrigerant to escape to the atmosphere.

As it has been determined that fluorocarbons, such as the type commonly used as a refrigerant in refrigeration systems, is environmentally harmful to the atmosphere it is highly desirable to prevent uncontrolled release of refrigerants, and further, as contaminated refrigerant can be reprocessed for reuse the retrieval and reprocessing of refrigerant is economically advantageous.

While it is known to recover and reprocess refrigerant from refrigeration systems, as shown in U.S. Pat. No. 3,699,781 wherein the refrigerant may be filtered, dehumidified and restored to its original specification, such systems as known, and disclosed in the aforementioned patent, are for use in large refrigerant reprocessing plants, and are not suitable for use by the refrigeration system serviceman servicing small air conditioning systems such as used in vehicles or window units, or refrigerator systems of the domestic type.

To the inventor's knowledge, a refrigerant retrieval and disposal system for refrigeration systems is not available which is of such size as to be portable and readily utilized in the servicing of small refrigeration systems.

SUMMARY OF THE INVENTION

It is an object of the invention to provide an environmental protecting method and apparatus for withdrawing refrigerant from refrigeration systems for disposal or reprocessing purposes wherein escape of the refrigerant to the atmosphere is prevented.

A further object of the invention is to provide a refrigerant retrieval system for withdrawing refrigerant from refrigeration systems wherein refrigerant retrieval may be automatically accomplished and the state of the refrigerant during pumping and storage is such as to minimize pump power requirements and maximize storage capacity.

An additional object of the invention is to provide a refrigerant retrieval system of a portable nature usable by service personnel at the site of the refrigeration apparatus.

A further object of the invention is to provide a refrigerant retrieval system which draws refrigerant from a refrigeration system and stores the withdrawn refrigerant within a pressurized container, such operation being under automatic control wherein refrigerant retrieval is automatically terminated upon a predetermined amount of refrigerant being received within the disposal container, or upon vacuum conditions within the refrigeration system attaining a predetermined value.

It is also an object of the invention to provide a combined refrigeration retrieval and charging system for refrigeration systems using a single electrically operated pump utilizing conduits and valves which is in the form of a portable unit for charging refrigeration systems with refrigerant, and withdrawing refrigerant from such system without contamination of the atmosphere by the refrigerant.

In the practice of the invention the refrigerant disposal system may be utilized separately, or in combination with a charging system, if desired. The basic concepts of the refrigerant retrieval and disposal system in either embodiment are similar, and both permit retrieval and disposal of a refrigerant without contamination of the atmosphere.

An electrically driven positive displacement pump having an inlet at which a vacuum is produced, selectively communicates with a refrigeration system such as used with refrigerators or air conditioning systems at the pump inlet through a suitable valve and conduit system. Preferably, the communication between the pump inlet and the refrigeration system is at both the low and high pressure sides of the refrigeration system compressor in order to quickly achieve optimum refrigerant evacuation. Also, preferably, a vaporizing coil is included in the conduit system intermediate the pump inlet and the refrigeration system to vaporize the refrigerant and minimize the likelihood of refrigerant in a liquid state entering the pump.

The pump outlet communicates with a valve and conduit system interconnecting the pump outlet with a refrigerant disposal storage container, and preferably, a cooling coil is interposed between the pump outlet and storage container for maintaining a reduced vapor pressure of the refrigerant, particularly at high ambient temperatures, which reduces the power requirements of the pump. Preferably, the cooling coil heat exchanger and vaporizing coil heat exchanger are contiguous and include common cooling fins, and a cooling fan forcing air over the coils and fins of the dual purpose heat exchanger improves the heat exchanging efficiency thereof.

It is desirable that termination of refrigerant retrieval be automatic upon the storage container being filled, or upon the refrigeration system being fully evacuated, and to this end the storage container is supported upon a weight sensing switch which will deenergize the pump upon a predetermined weight of refrigerant being contained within the disposal container. Also, a pressure sensing switch is located intermediate the cooling coil and disposal container for deenergizing the pump upon a predetermined pressure being produced within the disposal container, and the condition of the refrigeration system is sensed by a vacuum sensing switch interposed in the conduit intermediate the pump inlet and refrigeration system which deenergizes the pump upon a predetermined vacuum pressure existing within the refrigeration system.

In the combined refrigerant retrieval and charging system embodiment a single positive displacement pump is employed to evacuate the refrigeration system and fill the refrigerant storage and disposal container, and is also employed to draw fresh refrigerant into a measuring cylinder and force the refrigerant from the measuring cylinder into the refrigeration system during recharging of the system.

Brief Description of the Drawings

The aforementioned objects and advantages of the invention will be appreciated from the following description and accompanying drawings wherein.

Description of the Preferred Embodiment

It is an intent of the invention that the refrigerant retrieval and disposal system disclosed be of such design and size as to permit the system to be portable and utilized by service personnel on site. Accordingly, the illustrated apparatus may be concisely mounted in a permanent manner upon a two-wheel hand truck whereby the apparatus may be readily transported from a service truck to the refrigeration system being serviced.

Figure 1:
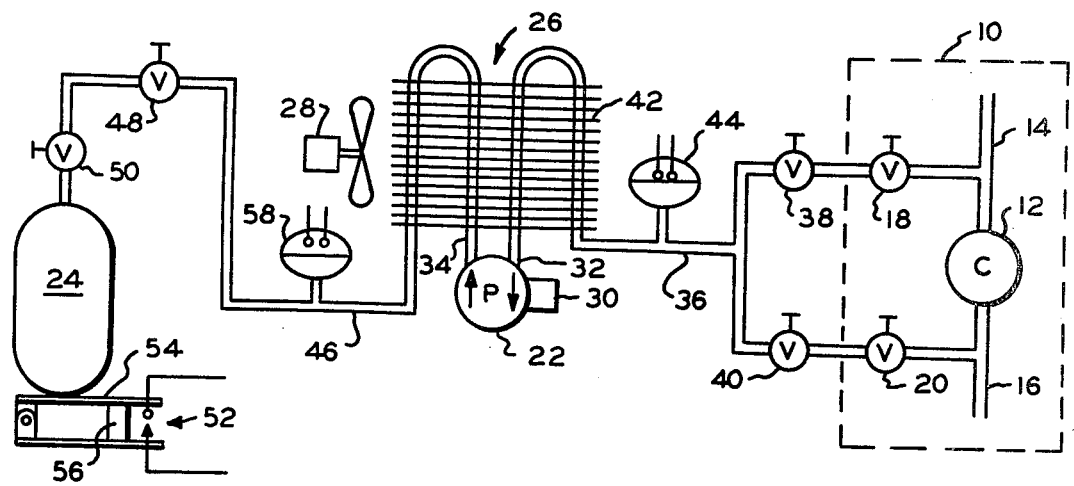
FIG. 1 is a diagramatic view of a refrigerant disposal and storage system in accord with the invention.

With reference to FIG. 1, a refrigeration system is schematically represented at 10, and the system will typically constitute an air conditioning system such as used in vehicles, window units or central domestic and commercial units, or a refrigerator system for food cooling. The refrigeration system includes the usual compressor 12 having a low pressure side conduit 14, and a high pressure side conduit 16. A manually operated valve 18 communicates with the conduit 14, while a manually operated valve 20 communicates with conduit 16.

The refrigerant retrieval and disposal system is preferably mounted upon a service hand truck, not shown, and includes a positive displacement transfer pump 22, a refrigerant disposal storage container 24, a dual purpose heat exchanger 26, a heat exchanger cooling fan 28, and conduits, valves and switches later described. The pump 22 is electrically driven by an electric motor 30, and includes an inlet 32 at which a subatmospheric or vacuum pressure is created, and the pump outlet 34 produces a positive or superatmospheric pressure.

The pump inlet 32 is connected to the refrigeration system 10 by conduit 36 and manually operated valves 38 and 40. The valve 38 communicates with refrigeration system valve 18, and valve 40 communicates with the compressor high side valve 20. Thus, by opening valves 18 and 38 the pump 22 will communicate with the low pressure side of compressor 12, while opening of valves 20 and 40 establishes communication between the pump and the high pressure side of the compressor. The conduit 36 extends through the heat exchanger fins 42 of heat exchanger 26 forming a vaporizing coil, and an electric vacuum pressure sensing switch 44 connected to motor 30 communicates with the conduit 36 intermediate the heat exchanger and refrigeration system for sensing the subatmospheric pressure within the conduit.

A conduit 46 communicates with the pump outlet 34 and extends through the heat exchanger fins 42 in heat exchanging relationship thereto forming a cooling coil, and the conduit includes a manual valve 48 adjacent the manual valve 50 of the disposal container 24 wherein refrigerant pressurized by the pump 22 will pass through the heat exchanger 26 into the disposal container 24. The disposal container 24 is supported upon a weight sensing electrical switch 52 connected to the circuit of motor 30 which consists of an upper pivotally mounted lever 54 supporting the container weight biased upwardly by a spring member 56 to maintain a normal separation between the switch contacts. The switch 52 will close upon a predetermined weight being imposed upon lever 54 by the disposal container 24, and the biasing force of the spring 56 and actuation of the switch 52 is predetermined to actuate the switch upon the disposal container becoming substantially filled with refrigerant. The switch 52 illustrated is of the normally open type wherein the contacts are separated, however, the switch could be of the normally closed type adapted to open upon a predetermined weight being imposed upon the switch, and the choice of the type of switch depends on the type of motor circuit employed.

For safety purposes a pressure sensing switch 58 communicates with the conduit 46 between the heat exchanger 26 and the disposal container 24, and during withdrawing of the refrigerant should the pressure within switch 58 exceed a predetermined value due to the container 24 being filled the pressure switch will be actuated to deenergize pump motor 30.

The electrically driven fan 28 is mounted adjacent the heat exchanger 26 for forcing ambient air over the heat exchanger fins 42, and as that the portion of the conduit 36 associated with the fins constitutes a vaporizing coil, while the portion of the conduit 46 directly associated with the fins 42 constitutes a cool coil the heat within the conduit 46 is transferred to the fins and to conduit 36. The cooling of the refrigerant within the conduit 46 lowers the vapor pressure which reduces the pump energy necessary to permit filling of the disposal container 24, and minimizes the horsepower requirements at the pump 22. Further, the heat dissipated at the heat exchanger 26 from the conduit 46 is partially transferred to the vaporizing coil portion of the conduit 36 to vaporize refrigerant therein. The vaporizing of the refrigerant prior to entering the pump 22 prevents "slugging" of the pump with liquid refrigerant and further aids in efficient pump operation at minimum horsepower requirements. It is to be noted that the air movement over the heat exchanger 26 as produced by the fan 28 is from the cooling coil toward the vaporizing coil to make most efficient use of the heat requirements.

To use the aforedescribed refrigerant retrieval apparatus the serviceman connects the conduit 36 to the refrigeration system 10 by conventional fittings, not shown, wherein the valve 38 is connected to the valve 18, and the valve 40 to the valve 20. Initially, each of these valves will be closed. The disposal container 24 will normally be empty, and the valves 38 and 40 may be opened. Either or both of the valves 18 and 20 may now be opened, and the pump 22 is started. Assuming both valves 18 and 20 to be opened the pump will be drawing refrigerant from the system 10 on both sides of the compressor 12 expediting removal of the refrigerant. However, the refrigerant can be removed from the system through either the valve 18 or 20, but refrigeration system evacuation is expedited by drawing from both sides of the compressor.

As the refrigerant is drawn into the conduit 36 through the heat exchanger 26 it will be vaporized prior to entering the pump 22, and the refrigerant gas will be pressurized at the pump and introduced into the conduit 46 and cooled as it passes through the heat exchanger. The refrigerant will then pass through valves 48 and 50 into the disposal container 24, and the evacuation of the refrigeration system 10 will continue until the disposal container 24 is filled, which is sensed by weight switch 54, or pressure switch 58, both of which are operatively connected to the motor 30 of the pump to de-energize the same upon actuation, or the evacuation will be terminated upon the vacuum switch 44 sensing a predetermined vacuum pressure which indicates that the refrigerant has been fully withdrawn from the system 10. The switch 44 also de-energizes the pump motor 30 when actuated.

Upon the refrigeration system 10 being completely evacuated of refrigerant the valves 48 and 50 will be closed, and the valves 18, 20, 38 and 40 closed and the refrigerant withdrawal system removed from the refrigeration system 10. The container 24 and valve 50 are removed as a unit from the associated apparatus, and the refrigerant within the container 24 is disposed of by storage, burial, or other approved disposal procedure without contamination of the atmosphere, and a new disposal container is attached to the conduit 46 at valve 48. Of course, the refrigerant within container 24 may be transported to a reprocessing and purifying plant for reuse, rather than disposal.

The location of the pump 22 with respect to the heat exchanger 26 assures that the refrigerant and components of the retrieval system which operate most efficiently at subatmospheric pressure are exposed to the vacuum side of the pump so that servicing duration is minimized, and all of the refrigerant will be removed from the refrigeration system. As the heat exchanger, pump, fan and other components of the system are of such size as to be readily mounted upon a portable hand truck the apparatus may be readily transported from job to job, and the removal and installation of the disposal containers 24 can be readily achieved.

Figure 2:
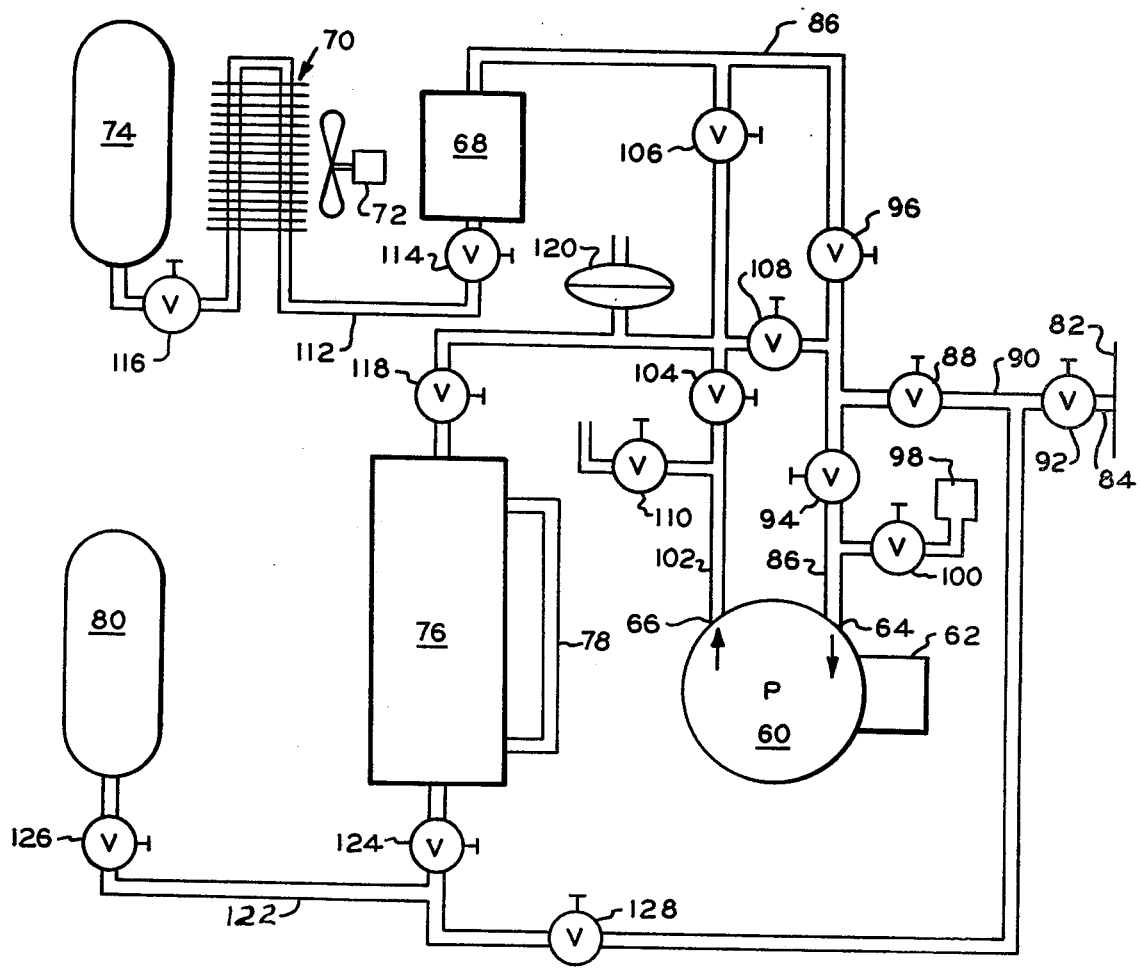
FIG. 2 is a diagramatic view of an embodiment of a combined refrigerant disposal and charging system utilizing the concepts of the invention.

In FIG. 2 a combined system is illustrated which permits a refrigeration system refrigerant to be withdrawn from the system for disposal or reprocessing purposes, and also permits the charging of the system with fresh refrigerant. The apparatus of FIG. 2 can also be mounted upon a portable hand truck, and the disclosed apparatus may be readily transported to the site of use.

With respect to the embodiment of FIG. 2, a single positive displacement vacuum pump 60 driven by electric motor 62 is employed for use with both the refrigerant retrieval and charging operations. The pump 60 includes a vacuum or subatmospheric inlet 64, and a pressurized outlet 66. A preliminary refrigerant disposal tank is represented at 68, a refrigerant cooler is shown at 70 having a motor driven cooling fan 72, and the refrigerant disposal container is represented at 74. The refrigerant charging components include a measuring and charging cylinder 76 having a sight glass 78, and bulk fresh refrigerant is supplied from pressurized container 80.

The refrigeration system to be serviced is schematically represented at 82 having a tap conduit 84 whereby the refrigerant may be drawn from, and introduced into, the system 82. The conduit 84 may communicate with both the high and low sides of the compressor of system 82, not shown, such as disclosed with respect to the system of FIG. 1, or the conduit 84 may be associated with either the high or low pressure side of the compressor which will permit refrigerant withdrawal and charging, but withdrawal cannot occur as quickly as if the refrigerant is simultaneously drawn from both sides of the compressor.

A conduit 86 connects to the pump inlet 64, and communicates with a valve 88 connected to conduit 90 which connects to valve 92 attached to the refrigeration system conduit 84. The conduit 86 communicates with the preliminary disposal tank 68 through valves 94 and 96, and conduit 86 also selectively communicates with the atmosphere through dehydrating filter 98 through valve 100.

The system further includes conduit 102 communicating with pump outlet 66 and with conduit 86 prior to tank 68 through valves 104 and 106, and conduit 102 may communicate with conduit 86 through valve 108. Also, the conduit 102 may selectively communicate with the atmosphere through valve 110.

Communication between the preliminary disposal tank 68 and the refrigerant cooler heat exchanger 70 is through conduit 112 and valve 114, and valve 116 is located at the disposal container 74.

The upper end of the charging cylinder 76 communicates with conduit 102 through valve 118, and the vacuum sensing control switch 120 communicates with conduit 102. The lower end of the charging cylinder 76 communicates with the refrigerant supply container 80 through conduit 122 and valves 124 and 126, and the charging cylinder also selectively communicates with the conduit 90 intermediate valves 88 and 92 through valve 128.

The aforedescribed apparatus is used in the following manner:

Assuming that the refrigeration system 82 is to be evacuated of contaminated refrigerant, the operator will connect the apparatus to system 82 through valve 92. Valves 94, 96 and 110 are open, and all of the remaining valves are closed. Using the vacuum mode of the pump 60 the preliminary disposal tank 68 is evacuated to atmosphere through valve 110, and the tank is evacuated to the full capacity of the vacuum pump.

The next cycle of operation is to withdraw the majority of the refrigerant from the refrigeration system 82 by means of the vacuum existing within the peliminary disposal tank 68 and to this end valves 88, 92 and 96 are opened, and the remaining valves are closed. The opening of valves 88, 92 and 96 permits approximately 75% of the refrigerant within system 82 to flow into the tank 68, and as this major portion of the refrigerant does not pass through the vacuum pump 60 contamination of the pump by the waste refrigerant is minimized, extending the life of the pump.

After the refrigerant pressure within the tank 68 and refrigeration system 82 equalizes the valves 88 and 92 remain open and valves 94, 104 and 106 are opened, and the remaining valves are closed. The vacuum pump 60 is then started which draws the remaining refrigerant from the system 82 through valves 92, 88 and 94, and forces the refrigerant through valves 104 and 106 into the tank 68. A vacuum is produced in the refrigeration system compatible with the capability of the vacuum pump which will evacuate all of the refrigerant from the system 82.

At this time all of the retrieved refrigerant will be within tank 68, and valves 100, 104, 106, 114 and 116 are opened while the remaining valves are closed, and, operation of the pump 60 will draw air into the pump through valve 100 and force air into the top of the preliminary disposal tank 68. The fact that valves 114 and 116 are open forces the refrigerant from tank 68 through refrigerant cooler 70, which lowers the vapor pressure of the refrigerant, and the refrigerant is forced into the disposal container 74. Of course, the fan 72 will be in operation to most effectively cool the refrigerant as it passes through heat exchanger 70. The closing of the valve 92 assures maintenance of the vacuum within the refrigeration system 82, as does the fact that valves 88, 94, 96 and 128 are also closed.

Assuming that it is now desired to recharge the refrigeration system 82 with fresh refrigerant the valves 94, 108, 110 and 118 are opened, while the remaining valves are closed. In this mode the upper end of the charging cylinder 76 is connected to the pump vacuum inlet 64 through valves 94, 108 and 118, and the pump outlet is discharged to the atmosphere. The level of evacuation of the charging cylinder is to the full capacity of the vacuum pump, or may be controlled by the vacuum switch 120 which is connected to pump motor 62.

Upon evacuation of the charging cylinder 76 the valves 124 and 126 are opened, and the remaining valves are all closed. The subatmospheric pressure within the charging cylinder 76 will now draw refrigerant into the charging cylinder from container 80 to the desired volume as readily observed in the sight glass 78. The system may be automated by using an electromechanical float system within the charging cylinder, and in either manual or automatic operation termination of the filling of the charging cylinder with refrigerant will cease upon valves 124 and 126 being closed.

The refrigeration system 82 is charged with the fresh refrigerant within charging cylinder 76 by forcing the refrigerant from the cylinder 76 into the system. In this mode the valves 100, 104, 118, 124, 128 and 92 are opened, and the remaining valves closed. Operation of the vacuum pump 60 will now draw filtered dehumidified air into the pump, creating a superatmospheric pressure within the upper region of the charging cylinder 76 forcing the refrigerant from the charging cylinder into the refrigeration system 82. Of course, termination of flow of the refrigerant into the system 82 must cease before all of the refrigerant is discharged from the cylinder 76 to prevent air from entering the refrigeration system 82, and upon the system being fully charged by the predetermined amount of refrigerant forced from charging cylinder 76 the valves 92, 124 and 128 are closed and the evacuation and recharging of the refrigeration system is completed.

It will be appreciated that various modifications within the disclosed scope of the invention may be made to FIG. 2. For instance, a vaporizing coil heat exchanger may be included within conduit 86, and a combined vaporizing coil and refrigerant cooler heat exchanger can be utilized as shown with respect to the embodiment of FIG. 1. Likewise, electric pressure switches may be included within conduits, and a vacuum pressure switch may be incorporated into various vacuum lines to stop the pump when the preliminary disposal tank 68, system 82, or charging cylinder 76 is adequately evacuated.

Also, it is appreciated that the use of atmospheric air to pressurize the charging cylinder to force refrigerant into the system 82 may create contamination problems, even with the use of the dehumidifying filter 98, and a refrigerant supply or inert gas may be used for communication with the vacuum conduit 86 to permit emptying of the charging cylinder.

By using a superatmospheric pressure to force the refrigerant from the charging cylinder 76 "boiling" and similar problems commonly encountered with refrigerant charging are eliminated, and it is possible to very accurately determine the amount of refrigerant within the cylinder 76, and the amount forced into the refrigeration system 82. The disclosed process of transferring the refrigerant from the cylinder 76 to the system 82 permits moving the refrigerant in a stable manner which permits accurate volumetric measurement either manually or by automatic means.

It is appreciated that various modifications to the inventive concept may be apparent to those skilled in the art without departing from the spirit of the invention.

I claim:

1. A portable refrigerant disposal system for removing refrigerant from a refrigeration circuit having a compressor having a low pressure inlet side and a high pressure outlet side comprising, in combination, a motor driven pump having a vacuum producing inlet and a pressure producing outlet, a first valve and a vaporizing coil conduit heat exchanger selectively establishing communication between said inlet and the refrigeration circuit, a valved refrigerant storage container, a second valve and cooling coil conduit heat exchanger selectively establishing communication between said pump outlet and said storage container, an electric fan producing a sequential flow of ambient air over said cooling and vaporizing coil heat exchangers, means removably connecting said storage container to said second valve, electrically operated sensing means sensing the amount of refrigerant within said storage container, and electrical conductor means connected to said sensing means and said motor driven pump terminating operation of said pump upon said storage container receiving a predetermined amount of refrigerant.

2. In a portable refrigerant disposal system as in claim 1 where said sensing means comprises weight sensing electric switch means, said storage container being supported by said switch means, said electric switch means adapted to be actuated upon a predetermined weight being supported by said switch means.

3. In a portable refrigerant disposal system as in claim 1 wherein said sensing means comprises an electric pressure sensing switch sensing the pressure within said storage container, said switch being operatively connected to said pump to deenergize said pump by said electrical conductor means upon switch actuation upon the pressure within said container attaining a predetermined value.

4. A refrigerant disposal system for removing refrigerant from a refrigeration circuit comprising, in combination, an electric motor driven pump having a vacuum producing inlet and a pressure producing outlet, a heat exchanger having a vaporizing coil conduit and a cooling coil conduit, said vaporizing coil conduit communicating with said pump inlet and selectively communicating with the refrigeration circuit through first valve means, said cooling coil conduit communicating with said pump outlet, an electric fan producing a sequential flow of ambient air over said heat exchanger cooling coil conduit and said vaporizing coil conduit, and a refrigerant storage container communicating with said cooling coil conduit through second valve means whereby refrigerant may be drawn from said refrigeration circuit through said vaporizing coil conduit and into said pump and pumped through said cooling coil conduit into said storage container.

5. In a refrigerant disposal system as in claim 4, a vacuum pressure sensing switch communicating with said vaporizing coil conduit, and a positive pressure sensing switch communicating with said cooling coil conduit, said switches being operatively connected to said pump controlling pump operation in accord with predetermined pressures within said conduits.

6. In a refrigerant disposal system as in claim 4, weight sensing means supporing said storage container, and a weight sensing switch associated with said weight sensing means operatively connected to said pump de-energizing said pump upon said storage container attaining a predetermined weight.

* * * * *